(12) United States Patent
Ehrhart et al.

(10) Patent No.: US 7,973,654 B2
(45) Date of Patent: Jul. 5, 2011

(54) CUTTERBAR FAILURE DETECTION SYSTEM AND METHOD

(75) Inventors: Philip J. Ehrhart, Narvon, PA (US); Luke J. Harris, Leola, PA (US)

(73) Assignee: CNH America LLC, New Holland, PA (US)

( * ) Notice: Subject to any disclaimer, the term of this patent is extended or adjusted under 35 U.S.C. 154(b) by 483 days.

(21) Appl. No.: 12/079,015

(22) Filed: Mar. 24, 2008

(65) Prior Publication Data
US 2009/0237227 A1 Sep. 24, 2009

(51) Int. Cl.
*B60Q 1/00* (2006.01)
(52) U.S. Cl. .............. 340/441; 340/438; 340/449; 56/6; 56/13.6
(58) Field of Classification Search .................. 340/441, 340/438, 449; 56/6, 13.6
See application file for complete search history.

(56) References Cited

U.S. PATENT DOCUMENTS

| | | | |
|---|---|---|---|
| 3,805,798 A | 4/1974 | Girodat | 130/27 |
| 3,863,428 A | 2/1975 | Baxter | 56/10.2 |
| 4,376,298 A | 3/1983 | Sokol et al. | 364/551 |
| 4,415,888 A | 11/1983 | van der Lely | 340/684 |
| 4,815,262 A | 3/1989 | Koch et al. | 56/13.6 |
| 5,012,635 A * | 5/1991 | Walters et al. | 56/13.6 |
| 5,083,976 A | 1/1992 | McClure et al. | 460/1 |
| 5,521,514 A | 5/1996 | Nelson et al. | 324/660 |
| 5,743,073 A * | 4/1998 | Paquet | 56/12.1 |
| 5,784,866 A * | 7/1998 | Campbell et al. | 56/6 |
| 5,953,893 A * | 9/1999 | Smith et al. | 56/320.1 |
| 5,996,323 A | 12/1999 | Campbell et al. | 56/6 |
| 6,778,894 B2 | 8/2004 | Beck et al. | 701/50 |
| 6,791,488 B2 * | 9/2004 | Diekhans et al. | 342/22 |
| 6,796,204 B2 * | 9/2004 | Verhulst et al. | 74/640 |
| 6,839,611 B1 | 1/2005 | Pfaff | 701/50 |
| 6,843,044 B2 | 1/2005 | Clauss | 56/10.3 |
| 2006/0021316 A1 | 2/2006 | Harkcom | 56/255 |

FOREIGN PATENT DOCUMENTS
JP 5596401 7/1980
* cited by examiner

*Primary Examiner* — Eric M Blount
(74) *Attorney, Agent, or Firm* — Patrick M. Sheldrake; Michael G. Harms

(57) ABSTRACT

A system and method for detecting impending failure of a component of a disc cutterhead of a cutterbar of a plant cutting machine, the components will generate at least one indicator of an impending failure thereof, utilizing a plurality of sensors distributed among the cutterheads, each of the sensors being configured and operable for sensing at least one of the indicators of impending failure and outputting signals representative thereof to a controller automatically operable for processing the signals, to enable identifying an individual location or one of the cutterheads in which an impending failure of one or more of the components is present, and outputting a signal representative thereof to a warning device. The indicators can include, but are not limited to, temperature, sound, and vibration. The controller is also operable for determining comparative threshold values for the indicators, to adapt to changing conditions and norms.

23 Claims, 5 Drawing Sheets

CUTTERBAR FAILURE DETECTION SYSTEM AND METHOD

TECHNICAL FIELD

This invention relates generally to a system and method for detecting impending or onset of failure of a component of a disc cutterbar of a plant cutting machine, and more particularly, to a system and method using a plurality of sensors for detecting a symptom or condition indicative of the impending failure of a component such as a bearing or gear of any individual cutterhead of the cutterbar, before secondary damage to other components of the cutterbar occurs.

BACKGROUND ART

Typical disc cutterbars used in agriculture include a side-by-side row of cutterheads. Some cutterbars utilize components including a train of meshed spur gears for driving the individual cutterheads, and others utilize a train including a main power shaft coupled by respective bevel gear sets, for delivering power to the respective cutterheads. The cutterheads each typically comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In both cases, the components of the cutterheads include bearings which support the shafts and gears. The cutting blades and discs are rotated at a relatively fast speed, and are susceptible to contact with hard objects, making the drive components, such as gears, bearings, and shafts vulnerable to damage and wear, and ultimately, failure. For background information on the structure and operation of some typical disc cutterbars, reference is made to E. E. Koch and F. F. Voler, U.S. Pat. No. 4,815,262; and Campbell et al., U.S. Pat. No. 5,996,323, the descriptive portions thereof being incorporated herein in full by reference.

When a component of a cutterhead, particularly, a gear or bearing, fails, hard metallic particles of the component may enter other components, such as bearings, or the interfaces between other components, such as enmeshed gear teeth, so as to cause possibly catastrophic secondary damage. Additionally, when a component breaks, proper repair may entail removing and cleaning the resulting particles from other components which may have received or picked up the particles from the failed component, which can be a time-consuming and expensive process. In this regard, some cutterbars utilize a common oil sump for all or some number of the cutterheads, such that failed component particles and broken pieces can be distributed throughout all or a large portion of the cutterbar, or at least to other components of the cutterbar, necessitating disassembly and cleaning all potentially exposed areas of the cutterbar, which greatly increases the time and expense of the repair.

It has been found that at some time prior to the onset of actual serious component failure wherein secondary damage is more likely to occur, which prior time is herein defined as an impending failure, the components may generate certain indicators of, or clues to, the impending failure, which indicators can include, but are not limited to, conditions such as increased heat, increased or changing sounds, and/or vibrations, which indicators may be different from the indicators of an actual, serious failure involving secondary damage or possibility thereof. It has been further surmised that if such indicators could be detected prior to onset of actual component failure and the effects that can lead to possible resultant damage to other components, repairs could be made more easily, inexpensively, and timely.

However, indicators of impending failure will typically be more subtle compared to those of actual failure, or significant onset thereof. Therefore, to detect impending failure, as opposed to actual onset of significant failure or damage, leading to problems such as metallic particles circulating through the oil sump and entering other components, it will be necessary to identify the indicators of the impending failure, and have the capability to detect or sense them when present. It will further be necessary to have the capability to distinguish the indicators from other, normal operating parameters or characteristics which will be present during operation of the cutterbar, and also detectable by whatever sensing or detecting medium is used. Still further, it is contemplated that, over time, or with changing conditions, such as, but not limited to, environmental changes, load changes, operation on different grades and slopes, normal wear, and the like, the characteristics and/or parameters used as the indicators may change, some more than others, but not in a manner so as to indicate an impending failure. As a result, it will be desirable to have a capability to recognize and adapt to such changes and variations, so as to have a capability to recognize when one or more of the characteristics and/or parameters used as the indicators, are sufficiently different from the others so as to indicate an impending failure.

Accordingly, what is sought is a system and method for detecting an impending failure, or initial onset of failure, of a component or components of an individual cutterhead of a cutterbar, before serious damage is likely to occur, to enable taking corrective action for avoiding actual failure of the component and possible secondary problems set forth above.

SUMMARY OF THE INVENTION

What is disclosed is a system and method for detecting an impending failure, or initial onset of failure, of a component or components of an individual cutterhead of a cutterbar of a plant cutting machine, to enable taking corrective action for avoiding actual failure of the component and possible secondary problems set forth above.

According to preferred aspect of the invention, a system and method for detecting impending failure of a component of an individual cutterhead of a disc cutterbar including a plurality of cutterheads, utilizes a controller configured and operable for automatically differentiating data outputted by a plurality of sensors disposed in or in proximity to the cutterheads, respectively, to determine a threshold value indicative of presence of a condition indicative of the impending failure, and processing or polling the data from the sensors individually or in pairs or other groups to determine existence of the condition in the cutterhead proximate thereto, and thus the location of the cutterhead including the failing component or components, and even the identify of the specific component. The processor can then output an appropriate warning signal to an output device, such as a display device or screen, signal light, audible alarm, or the like.

According to another preferred aspect of the invention, the sensors can be connected to the controller individually, such as via wires of a wiring harness, or jointly over a suitable communications network, such as, but not limited to, a controller area network, a wireless network, or the like. The controller can comprise any suitable data processing device, such as the well known, commercially available computerized controllers found on self-propelled plant cutting machines and tractors, such as, but not limited to, the controller of an SP windrower tractor presently available from CNH.

According to still another preferred aspect of the invention, the sensors are each operable for sensing or detecting a condition which is an indicator of an impending failure of a component, such as, but not limited to, a bearing, shaft and/or gear or gears of a cutterhead. The sensors can comprise, for instance, a temperature sensor such as, but not limited to, a thermocouple, thermistor, infrared sensor, or other suitable commercially available temperature sensor. The sensors can also comprise a sound or acoustic sensor, such as, but not limited to, a microphone, or a vibration sensor, such as an accelerometer, all of which are well-known, commercially available devices.

In each instance, the sensors will be selected for their ability to detect or sense a particular indicator or indicators of a particular impending signal values, and signal values generated during abnormal or intermittent events, such as when a knife or cutter of the cutterhead strikes an object, such as a rock, or the ground, or when ambient temperatures are low or high, during start up when lubricant circulation and/or pressure is low, or when the lubricant oil becomes dirty or has been recently changed. Further in this regard, the controller can be programmed to learn or determine baseline values indicative of normal sensor values, and set threshold values for the signals indicative of one or more impending failure conditions, and/or to track rates of change of the signal values over time, and individually with respect to the sensors. In this regard, the controller can be programmed so as to be adaptive to changes and/or differences in sensor outputs resulting from conditions such as, but not limited to, differences in locations of some sensors relative to others, normal wear, and environmental temperature variations, and so as to recognize and accommodate sensor signal variations that result from spikes such as from rock strikes and the like, and temporary conditions such as load variations, tilting and the like, such that the thresholds can be varied or adapted, to enable accurately identifying signal values that are beyond norms determined for a particular sensor or group of sensors. And, further in this regard, sensor data for a relatively long period of time can be used for determining threshold values indicative of impending failure, to reduce the effects of signal spikes and the like.

According to a further aspect of the invention, the controller can monitor and thus factor power consumption and other load indicators, into the signal processing for determining the existence of an impending failure. The controller can also differentiate signal values based on factors such as sensor location. For instance, for a cutterbar powered from one or both ends, sensors located closer to the powered end of a main shaft may be subject to greater power throughput, and thus generate higher heat, noise, vibration, and the like, and the controller can process the signals to accommodate this. And, as another aspect of the invention, the sensors can be located directly on or in the individual cutterheads, or at other locations proximate thereto, such as between side by side ones of the cutterheads, so as to be capable of sensing indicators of impending failure generated by components of one or both of the proximate cutterheads. In this latter instance, the signals from pairs of the sensors associated with (e.g., on opposite sides) of individual ones of the cutterheads can be polled, to determine the location of an impending failure.

DETAILED DESCRIPTION OF THE INVENTION

Figure 1:
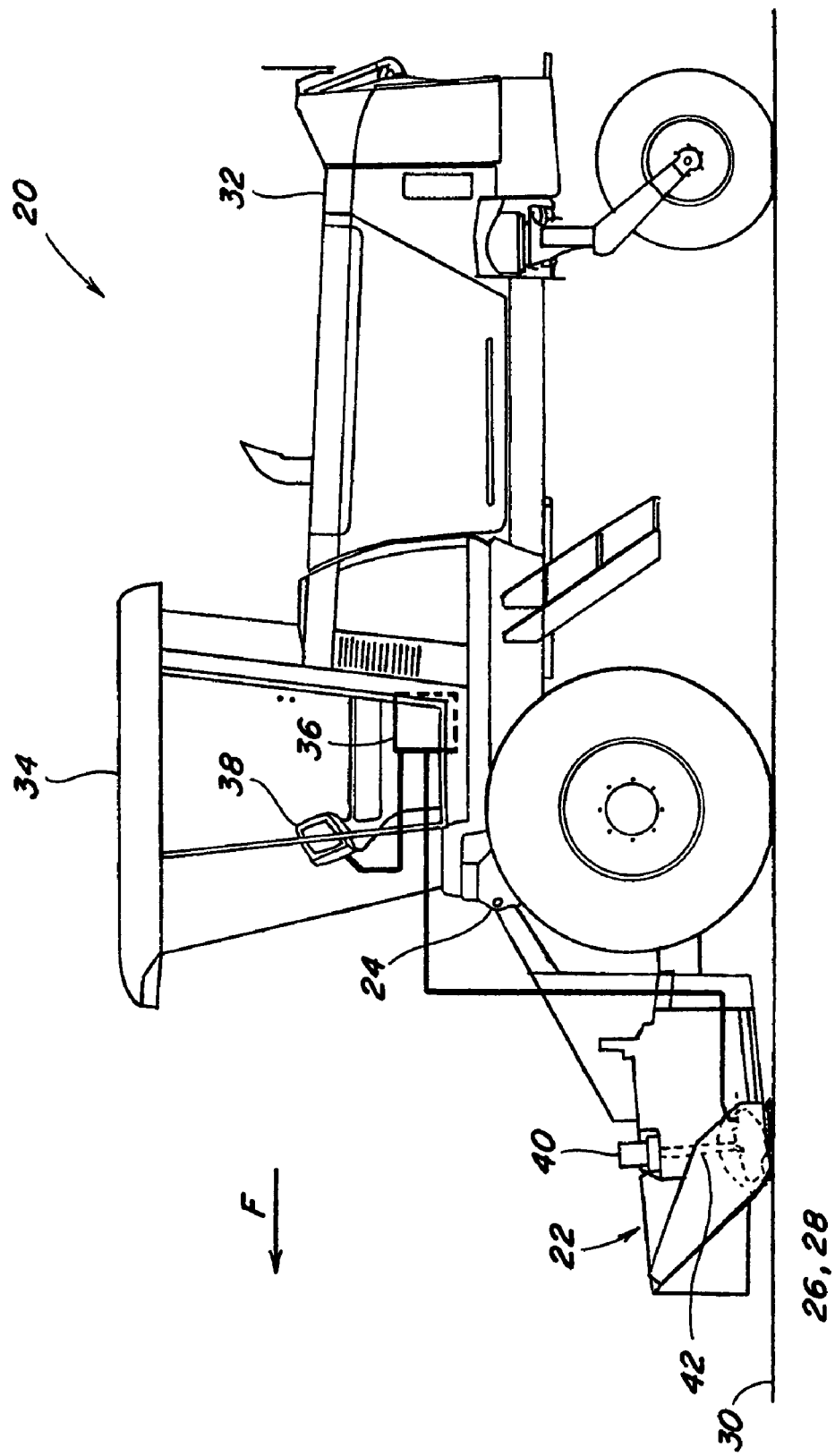
FIG. 1 is a simplified side view of a representative plant cutting machine, which is a windrower, incorporating a system and method of the invention for detecting an impending failure of a cutterhead of a cutterbar of the machine.
Figure 2:
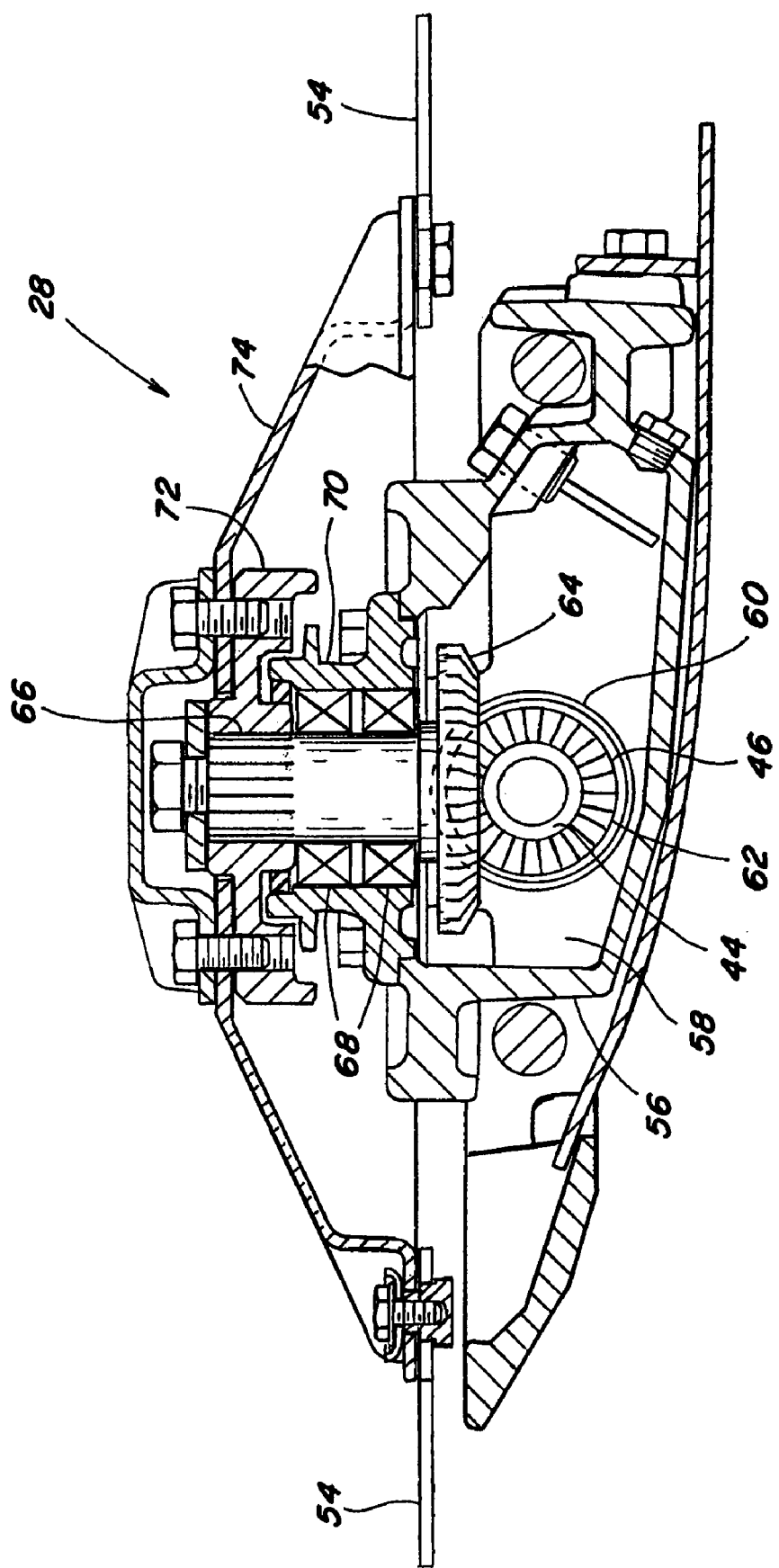
FIG. 2 is an enlarged fragmentary sectional view of a representative cutterhead of the cutterbar of FIG. 1, showing components thereof.

Turning now to the drawings wherein several preferred embodiments of the invention are shown, in FIG. 1, a conventional, well known agricultural cutting machine, which is a windrower 20, is shown including a header 22. Header 22 is shown supported in the conventional, well-known manner on a forward end 24 of windrower 20, and includes a cutterbar 26 supported on a lower region thereof, extending along the sideward extent thereof. Cutterbar 26 includes a plurality of disc cutterheads 28 disposed in side-by-side relation, and operable for cutting or severing crops such as, but not limited to, grasses, legumes, and small grains such as wheat and barley, as windrower 20 is moved in a forward direction, denoted by arrow F, over the surface of a field 30. Windrower 20 includes a self-propelled tractor 32, including an operator cab 34. Tractor 32 includes a microprocessor based controller 36, operable in the well-known manner for controlling a variety of systems and operations of tractor 32, as well as header 22. Controller 36 is connected via a suitable conductive path such as a wiring harness, a communications network such as a controller area network, or the like, with a variety of operator controls and a display device 38 located within cab 34. Display device 38 is operable in the well-known manner for displaying information and messages, including warnings, for viewing by an operator seated in cab 34. Referring also to FIG. 2, cutterheads 28 of cutterbar 26 are rotatably powered by fluid motors 40 disposed thereabove at opposite ends of header 22, and connected thereto by downwardly extending drive shafts 42. Here, it should be noted that cutterbar 26 of header 22 is intended to be representative of a wide variety of applications for the system and method of the invention explained below, and therefore is not to be considered as limiting.

Figure 3:
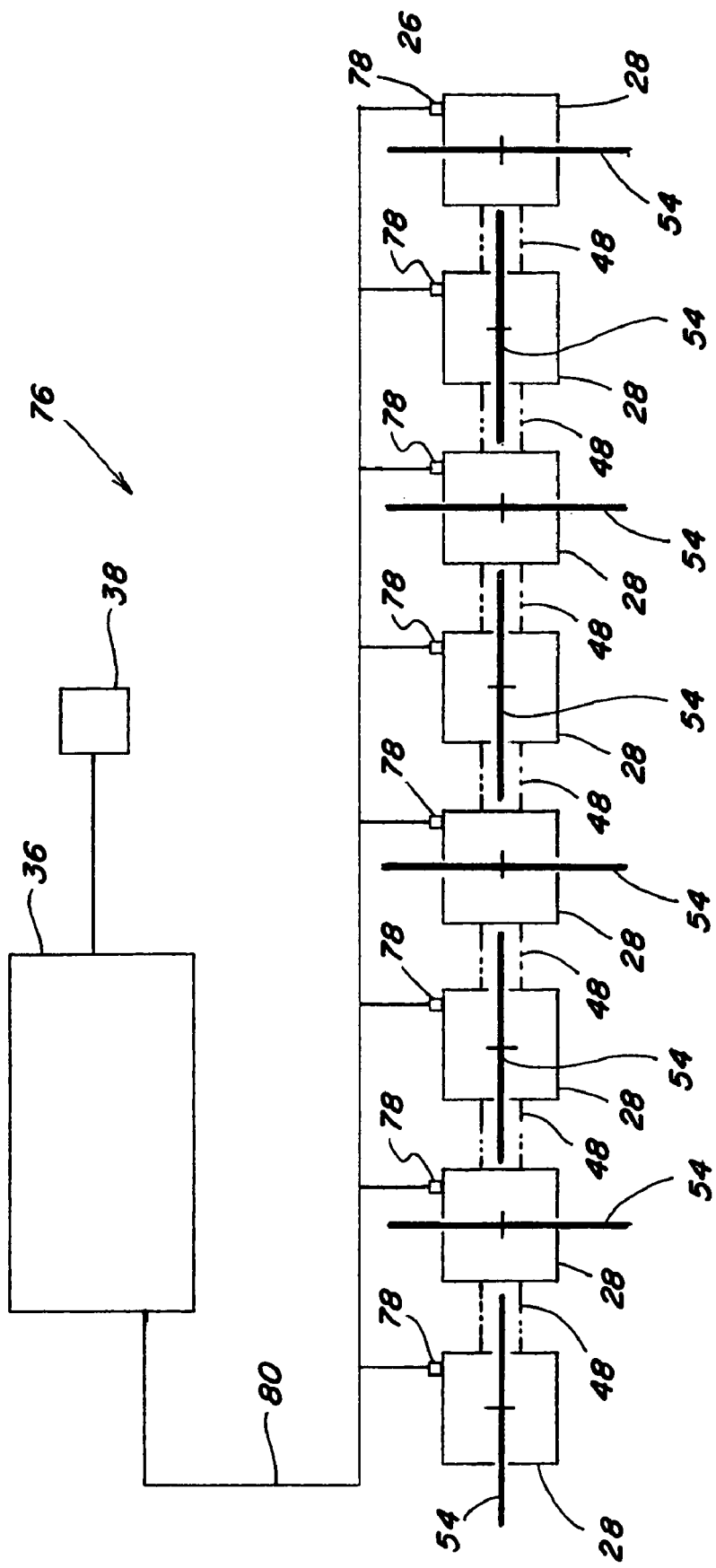
FIG. 3 is a simplified schematic top view of one embodiment of a cutterbar for the machine of FIG. 1, illustrating the system of the invention incorporated therewith.

In regard to the latter point above, referring also to FIGS. 2 and 3, which are a sectional view of a representative cutterhead 28, and a schematic top view of cutterbar 26, respectively, cutterbar 26 is of the type utilizing a sidewardly extending main shaft 44 which drives respective cutterheads 28 via bevel gearsets 46 located within the cutterheads 28, respectively, in the well-known manner. This is intended to be representative of a variety of well-known, commercially available cutterbar constructions, including, but not limited to, those wherein cutterheads 28 are individually mounted on a sidewardly extending unitary cutterbar structure, and those wherein cutterheads 28 comprise modular structures joined together directly, or by spacer modules, through which shaft 44 extends.

Figure 4:
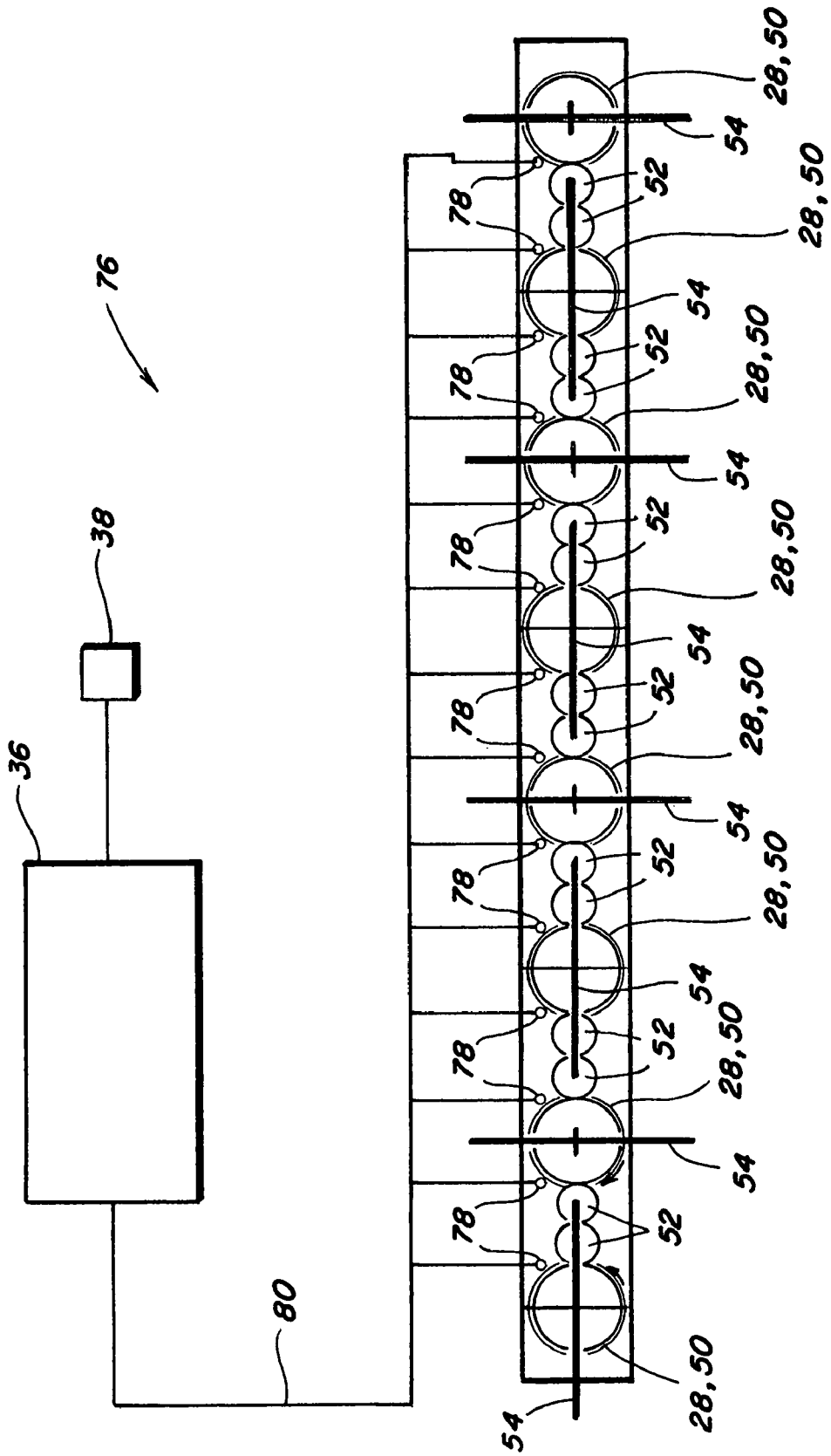
FIG. 4 is a simplified schematic top view of another embodiment of a cutterbar for the machine of FIG. 1, illustrating the system of the invention incorporated therewith.

Referring also to FIG. 4, an alternative cutterbar 26A is illustrated of the type which includes a train of spur gears 50 of cutterheads 28, enmeshed with spur gears 52 disposed between cutterheads 28 and rotatable as indicated by the arrows, for transmitting power thereto. Here, it should be noted that on cutterbars 26 and 26A of FIGS. 3 and 4, opposing sets of knives 54 of each cutterhead 28 are denoted by a heavy line for simplicity of illustration. It should also be noted that adjacent ones of sets of knives 54 extend in angularly offset directions, as is the common practice.

Referring more particularly to FIG. 2, representative cutterhead 28 generally includes a lower housing 56 defining a sump 58 through which main shaft 44 extends, and containing bevel gearset 46. Sump 58 will contain a quantity of lubricating oil (not shown), which will be slung and/or circulated to the components of the cutterhead requiring lubrication, in the well-known manner. Sump 58 may be self-contained, or extend between some or all of cutterheads 28, both of which practices are well-known. Main shaft 44 is supported at both sideward ends of housing 56, by bearings 60. Components of bevel gear set 46 include a driving gear 62 mounted to main shaft 44 for rotation therewith, and a driven gear 64 enmeshed with gear 62 and oriented at an angle thereto. Driven gear 64 is mounted on components including an upwardly extending stub shaft 66 for rotation therewith, supported by bearings 68 contained in an upper bearing housing 70 mounted to lower housing 56. Stub shaft 66 carries a disc hub 72 for rotation therewith, and to which a knife disc 74 is mounted. Knife disc 74, in turn, carries knives 54, mounted thereon in oppositely extending relation.

Referring in particular also to FIG. 1, in operation, fluid motors 40 will rotate drive shafts 42 at opposite ends of header 22, which will rotate drive shaft 42, to rotate double gearsets 46 of each cutterhead 28, to thereby rotate disks 74 and knives 54. Gearsets 46 of adjacent ones of cutterheads 28 will be reversed, to effect opposite rotation of adjacent sets of knives 54. Also, the gearsets allow timing the rotational positions of the adjacent sets of knives, to allow close spacing thereof without contact and interference.

Here, it can be observed that should any of bearings 60 or 68 begin to disintegrate and release hard, metallic particles thereof, such particles could travel into any of the other bearings 60 or 68, or between the enmeshed teeth of gearset 46, to cause damage thereto. And, if a common sump is utilized, the particles could circulate to one or more other cutterheads. Similarly, in the event of failure of gearset 46, which can include, for instance, disintegration, chipping, or breakage of one or more teeth of the enmeshed gears, the resulting particles, or gear teeth could circulate among and damage other components. Referring more particularly to FIG. 4, similar problems can occur in relation to gears 50 and 52 of each cutterhead, as well as the bearings thereof.

As a result of the above discussed risk of damage, it has been found to be desirable to have the capability to determine the existence of an impending failure of a component or components of a cutterhead, before the onset of more serious problems as just discussed, and to provide a warning thereof to an operator and/or service personnel. This capability is provided by the system and method of the present invention, as explained hereinafter.

Referring again to FIGS. 3 and 4, essentially a system 76 of the invention will include a plurality of suitable sensors, denoted generically by sensors 78, distributed among cutterheads 28, and configured and operable for sensing or detecting indicators of an impending failure of components within or associated with cutterheads 28, respectively. As nonlimiting examples, for the eight cutterbar 26 of FIG. 3, a quantity of eight sensors 78 are illustrated in connection with cutterheads 28, respectively, and for cutterbar 26A of FIG. 4, a quantity of 14 sensors 78 are illustrated distributed among the eight cutterheads 28 and seven gears 52. In this regard, it should be noted that a lesser quantity, or a greater quantity, of sensors 78 could be provided in association with the cutterbars, as desired or required for detecting particular numbers of, types of, and/or locations of, conditions indicative of impending component failures. For example, cutterbar 26A could be provided with a lesser number of sensors 78, as would be suitable for sensing impending failure of the particular components sought to be monitored. Sensors 78 are connected to controller 36 of windrower 20 (FIG. 1) via suitable conductive paths 80, which can comprise, for instance, wires of a wiring harness, a communications network, such as a controller area network, or other suitable well-known paths for communicating data between elements of a machine such as the subject windrower, for outputting signals representative of sensed conditions to controller 36. Controller 36, in turn, is operable for processing the signals to determine existence of an indicator of impending failure, and the location thereof, and outputting a signal to display device 38, or another warning device, to alert the operator and/or service personnel.

Sensors 78 can each comprise, for instance, a temperature sensor such as, but not limited to, a thermocouple, thermistor, infrared sensor, or other suitable commercially available temperature sensor. Sensors 78 can alternatively comprise sound or acoustic sensors, such as, but not limited to, microphones. Sensors 78 can also comprise vibration sensors, such as accelerometers. It is contemplated that which ever sensors are used, they will be subjected to a range of conditions in addition to those selected to be indicators of impending component failure.

To avoid problems resulting from background conditions and intermittent events, such as when a knife or cutter of the cutterhead, or the cutterhead itself, strikes a hard object, such as a rock, or the ground, or when ambient temperatures are low or high, during start up when lubricant circulation and/or pressure is low, or when the lubricant oil becomes dirty or has been recently changed, sensors 78 can be selected, tuned or operated so as not to detect such conditions, or the signals outputted by sensors 78 can be conditioned or filtered, as required or desired for a particular application. Further in this regard, controller 36 can be programmed to learn or determine baseline values indicative of normal sensor values, and set threshold values for the signals indicative of one or more impending failure conditions, and/or to track rates of change of the signal values over time, and individually with respect to sensors 78. In this regard, because multiple essentially identical components are being monitored using an array of essentially identical sensors, controller 36 can be programmed to compare the relative values of the outputs of the identical sensors sensing the conditions of identical components, in looking for outlayers, that is, signal values lying out of a particular range of values, or norm, for determining existence of a problem with a component or components. Thus, controller 36 is capable of adaptively varying the threshold or thresholds to correspond with changes or trends in the signals. This can be done for one or more groups of the sensors, which may have signal values that vary or trend differently from others for a variety of reasons, such as due to location, relative loads, and the like. The signal data used for determining thresholds can also be for a relatively long period of time, so as to minimize effects of intermittent or periodic spikes, such as can occur as a result of rock strikes and the like, and also for minimizing short term data trends, such as can occur as a result of temporary heavy load conditions, operation on side hills, and the like. Additionally, controller 36 can monitor and factor other information received from other systems of windrower 20, such as, but not limited to, power consumption and other load indicators, into the signal processing for determining the existence of an impending failure, or isolating it from other sensed events.

Controller 36 can also differentiate signal values based on factors such as sensor location. In this regard, for a cutterbar, such as cutterbar 26, powered from one or both ends, sensors 78 located closer to the powered end of main shaft 44 may be subject to greater power throughput, and thus generate higher heat, noise, vibration, and the like, and controller 36 can process the signals to accommodate this. In this latter instance, the signals from pairs of sensors 78 associated with (e.g., on opposite sides) of individual ones of the cutterheads 28 can be polled, to determine the location of an impending failure.

As an example, individual ones of sensors 78 in proximity to, or on, a particular cutterhead 28 can be individually polled, or polled in pairs, or another suitable number, and the signal values thereof compared to a threshold value or values, which can be predetermined, or determined as a function of received signal values, to determine existence of an indicator of an impending fault, which can be, for instance, an elevated temperature, a sound of a particular amplitude or pitch, or a vibration of a particular amplitude, frequency, or other characteristic. As another example, operation of one or more pairs of enmeshed gears may generate a sound having a signature amplitude or pitch, and frequency, indicative of gear tooth and/or bearing wear, and a resulting change in distances between centers of the gears. As another example, baseline temperatures for each of sensors 78 can be established via a body of data collection under normal operating conditions, and an impending failure determined from an elevated temperature sensed by one or a pair of sensors 78, relative to the baseline temperature for that sensor 78 or sensors 78, even if the elevated temperature is within a baseline value or range for one or more other sensors.

Figure 5:
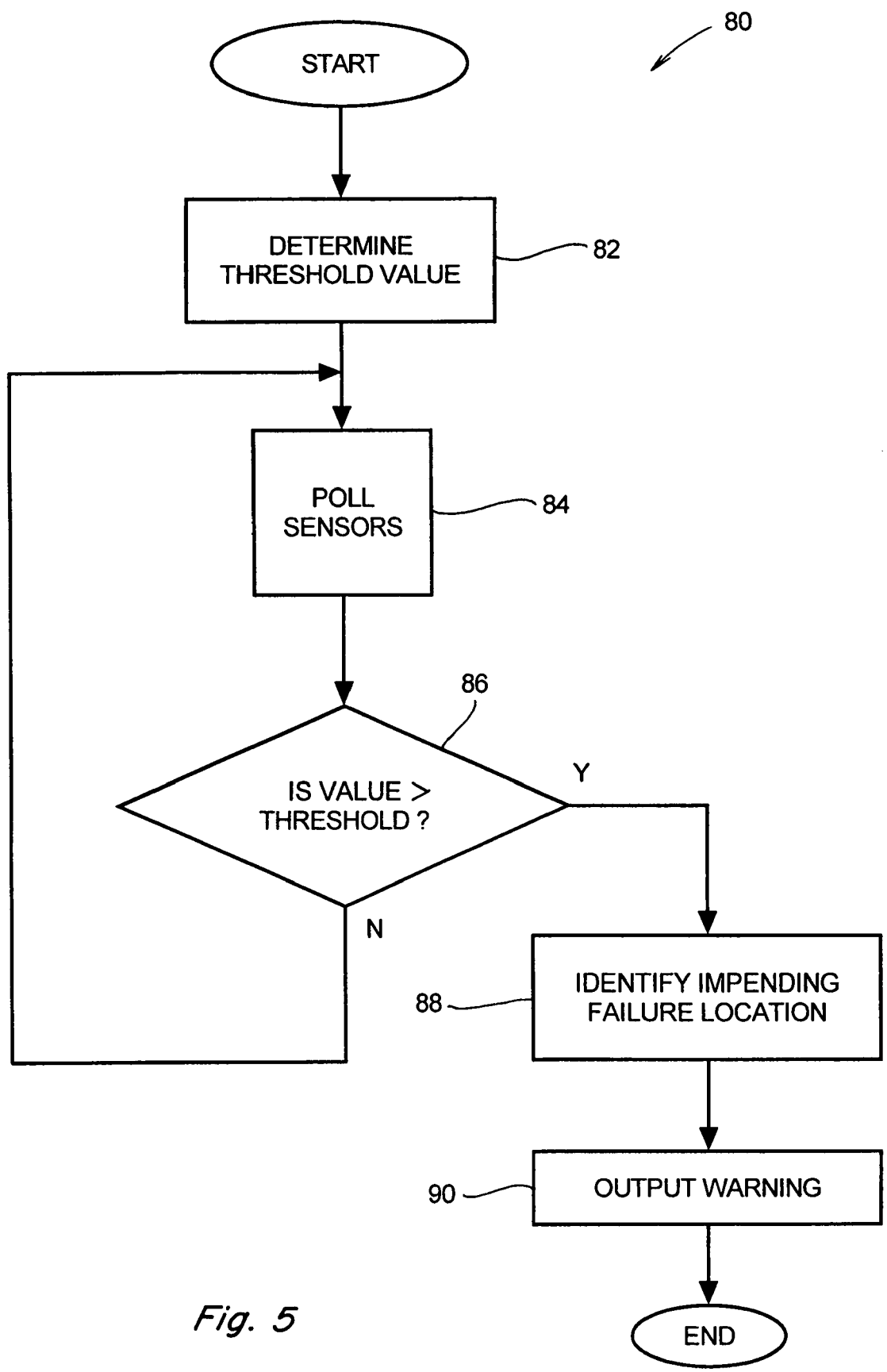
FIG. 5 is a high-level flow diagram illustrating steps of one embodiment of the method of the invention.

Referring also to FIG. 5, a high-level flow diagram 80 illustrating steps of exemplary aspect of a method for detecting the presence of an indicator of an impending component failure, is illustrated. In flow diagram 80, a threshold value for a sensor signal representative of an indicator of an impending failure is determined by controller 36, such as in any of the above described manners, as denoted by block 82. The signals of individual sensors 78, or predetermined pairs or other numbers of sensors 78, are then polled by controller 36, as denoted at block 84, and decision block 86. At decision block 86, if an individual sensor value is greater than the threshold value, controller 36 will determine that an impending failure is present at a location associated with the subject sensor, or sensors, as denoted at block 88. Responsively, controller 36 will output a warning signal for display by display device 38, as denoted by block 90. At decision block 86, if the sensor signal is not greater than the threshold value, controller 36 will continue polling the individual sensors, or pairs or groups, looping through blocks 84 and 86, and 90 if a problem is detected, until the process is interrupted or stopped.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for detecting impending failure of a component of a disc cutterhead of a cutterbar of a plant cutting machine, comprising:
    a controller operable for outputting signals to a warning device;
    a cutterbar including a plurality of disc cutterheads connected in commonly driven relation, each of the cutterheads having components including at least one shaft supported by bearings, and at least one set of enmeshed gears, the components being connected in driving relation to a disc cutter of the cutterhead carrying at least one cutting blade and rotatable by rotation of the components, and wherein at least one of the components will generate at least one indicator of an impending failure thereof during the impending failure;
    a plurality of sensors distributed among the cutterheads, each of the sensors being configured and operable for sensing at least one of the indicators of impending failure and outputting signals representative thereof to the controller;
    the controller being automatically operable for processing the signals outputted by the sensors, to identify a location of the impending failure among the cutterheads, and outputting a signal representative thereof to the warning device; and
    the signals outputted by the sensors will have values corresponding to proximity of the sensors to the indicators of impending failure, respectively, and wherein the controller is automatically operable to compare are the values of the signals for identifying the location of the impending failure and wherein the controller is configured to differentiate signals and their respective thresholds based on their location on the cutterbar.

2. A system for detecting impending failure of a component of a disc cutterhead of a cutterbar of a plant cutting machine, comprising:
    a controller operable for outputting signals to a warning device;
    a cutterbar including a plurality of disc cutterheads connected in commonly driven relation, each of the cutterheads having components including at least one shaft supported by bearings, and at least one set of enmeshed gears, the components being connected in driving relation to a disc cutter of the cutterhead carrying at least one cutting blade and rotatable by rotation of the components and wherein at least one of the components will generate at least one indicator of an impending failure thereof during the impending failure;
    a plurality of sensors distributed among the cutterheads, each of the sensors being configured and operable for sensing at least one of the indicators of impending failure and outputting signals representative thereof to the controller;
    the controller being automatically operable for processing the signals outputted by the sensors, to identify a location of the impending failure among the cutterheads, and outputting a signal representative thereof to the warning device; and
    the controller is automatically operable for processing the signals outputted by the sensors to determine and update a threshold value during operation of the cutterbar, representative of presence of an impending failure, and to then compare selected ones of the signals to the threshold value to identify the location of the impending failure.

3. The system of claim 2, wherein the selected ones of the signals comprise the signals from at least one of the sensors closest to one of the cutterheads.

4. A system for detecting impending failure of a component of a disc cutterhead of a cutterbar of a plant cutting machine, comprising:
- a controller operable for outputting signals to a warning device;
- a cutterbar including a plurality of disc cutterheads connected in commonly driven relation, each of the cutterheads having components including at least one shaft supported by bearings, and at least one set of enmeshed gears, the components being connected in driving relation to a disc cutter of the cutterhead carrying at least one cutting blade and rotatable by rotation of the components, and wherein at least one of the components will generate at least one indicator of an impending failure thereof during the impending failure;
- a plurality of sensors distributed among the cutterheads, each of the sensors being configured and operable for sensing at least one of the indicators of impending failure and outputting signals representative thereof to the controller;
- the controller being automatically operable for processing the signals outputted by the sensors, to identify a location of the impending failure among the cutterheads, and outputting a signal representative thereof to the warning device; and
- the controller is programmed to compare the relative values of the signals from the plurality of sensors and determine a fault if one signal value is outside of a range of the signals from the other of the plurality of sensors.

5. A system for detecting impending failure of a component of a disc cutterhead of a cutterbar of a plant cutting machine, comprising:
- a controller operable for outputting signals to a warning device;
- a cutterbar including a plurality of disc cutterheads connected in commonly driven relation, each of the cutterheads having components including at least one shaft supported by bearings, and at least one set of enmeshed gears, the components being connected in driving relation to a disc cutter of the cutterhead carrying at least one cutting blade and rotatable by rotation of the components, and wherein at least one of the components will generate at least one indicator of an impending failure thereof during the impending failure;
- a plurality of sensors distributed among the cutterheads, each of the sensors being configured and operable for sensing at least one of the indicators of impending failure and outputting signals representative thereof to the controller;
- the controller being automatically operable for processing the signals outputted by the sensors, to identify a location of the impending failure among the cutterheads, and outputting a signal representative thereof to the warning device; and
- the controller is configured to determine a fault as a function of both a signal from at least one of the sensors and at least one load indicator from an attached vehicle.

6. The system of claim 1, wherein the at least one indicator of impending failure comprises a vibration level.

7. The system of claim 1, wherein the at least one indicator of impending failure comprises a temperature level.

8. The system of claim 1, wherein the sensors are connected to the controller for outputting the signals thereto by a communications network, and the controller is programmed to automatically process the signals by polling the signals individually, to identify the location of the impending failure when present.

9. The system of claim 1, wherein the impending failure comprises an increase in friction generated by the rotation of the components, the at least one indicator of the impending failure comprises an increase in a temperature generated by the increase in friction, and at least one of the sensors is configured and operable for sensing the increase in the temperature.

10. The system of claim 1, wherein the impending failure comprises an increase in friction generated by the rotation of the components, the at least one indicator of the impending failure comprises a change in a sound characteristic emitted by the components as a result of the increase in friction, and at least one of the sensors is configured and operable for sensing the change in the sound characteristic.

11. The system of claim 1, wherein the impending failure comprises a change in a spacing between at least two of the components of at least one of the cutterheads, the indicator of the pending failure comprises a change in a vibration characteristic transmitted by the at least two of the components as a result of the change in the spacing, and at least one of the sensors is configured and operable for sensing the change in the vibration characteristic.

12. The system of claim 11, wherein the at least one of the sensors comprises an accelerometer.

13. A method for detecting impending failure of a component of a disc cutterhead of a cutterbar of a plant cutting machine, comprising steps of:
- providing a controller operable for outputting signals to a warning device;
- providing a cutterbar including a plurality of disc cutterheads connected in commonly driven relation, each of the cutterheads having components including at least one shaft supported by bearings, and at least two enmeshed gears, the components being connected in driving relation to a disc cutter of the cutterhead carrying at least one cutting blade and rotatable by rotation of the components, and wherein at least one of the components will generate at least one indicator of an impending failure thereof when present;
- providing a plurality of sensors distributed on or adjacent to the cutterheads, each of the sensors being configured and operable for sensing at least one of the indicators of impending failure and outputting signals representative thereof to the controller;
- operating the sensors while rotating the components of the cutterheads, and operating the controller to automatically process the signals when outputted by the sensors for identifying a location of an impending failure of one or more of the components, and outputting a signal representative thereof to the warning device; and
- wherein the signals outputted by the sensors will have values corresponding to proximity of the sensors to the indicators of impending failure, respectively, and wherein the step of operating the controller includes comparing the values of the signals for identifying the cutterhead in which the impending failure is present wherein the controller is configured to differentiate signals and their respective thresholds based on their location on the cutterbar.

14. A method for detecting impending failure of a component of a disc cutterhead of a cutterbar of a plant cutting machine, comprising steps of:
- providing a controller operable outputting signals to a warning device;

providing a cutterbar including a plurality of disc cutterheads connected in commonly driven relation, each of the cutterheads having components including at least one shaft supported by bearings, and at least two enmeshed gears, the components being connected in driving relation to a disc cutter of the cutterhead carrying at least one cutting blade and rotatable by rotation of the components, and wherein at least one of the components will generate at least one indicator of an impending failure thereof when present;

providing a plurality of sensors distributed on or adjacent to the cutterheads, each of the sensors being configured and operable for sensing at least one of the indicators of impending failure and outputting signals representative thereof to the controller;

operating the sensors while rotating the components of the cutterheads, and operating the controller to automatically process the signals when outputted by the sensors for identifying a location of an impending failure of one or more of the components, and outputting a signal representative thereof to the warning device; and wherein the controller is automatically operable for processing the signals outputted by the sensors to determine and update a threshold value during operation of the cutterbar representative of presence of an impending failure, and the step of operating the controller comprises automatically comparing selected ones of the signals to the threshold value to identify the cutterhead in which the impending failure is present.

15. The method of claim 14, wherein the selected ones of the signals comprise the signals from at least one of the sensors closest to one of the cutterheads.

16. A method for detecting impending failure of a component of a disc cutterhead of a cutterbar of a plant cutting machine, comprising steps of:

providing a controller operable for outputting signals to a warning device;

providing a cutterbar including a plurality of disc cutterheads connected in commonly driven relation, each of the cutterheads having components including at least one shaft supported by bearings, and at least two enmeshed gears, the components being connected in driving relation to a disc cutter of the cutterhead carrying at least one cutting blade and rotatable by rotation of the components, and wherein at least one of the components will generate at least one indicator of an impending failure thereof when present;

providing a plurality of sensors distributed on or adjacent to the cutterheads, each of the sensors being configured and operable for sensing at least one of the indicators of impending failure and outputting signals representative thereof to the controller;

operating the sensors while rotating the components of the cutterheads, and operating the controller to automatically process the signals when outputted by the sensors for identifying a location of an impending failure of one or more of the components, and outputting a signal representative thereof to the warning device; and wherein the controller is configured to determine a fault as a function of both a signal from at least one of the sensors and at least one load indication from an attached vehicle.

17. The method of claim 13, wherein the sensors are connected to the controller for outputting the signals thereto by a communications network, and the controller is programmed to automatically process the signals by polling the signals individually, to identify the location of the impending failure.

18. The method of claim 13, wherein the impending failure comprises an increase in friction generated by the rotation of the components, the indicator of the impending failure comprises an increase in a temperature generated by the increase in friction, and at least one of the sensors is configured and operable for sensing the increase in the temperature.

19. The method of claim 13, wherein the impending failure comprises an increase in friction generated by the rotation of the components, the indicator of the impending failure comprises a change in a sound emitted by the components as a result of the increase in friction, and at least one of the sensors is configured and operable for sensing the change in the sound.

20. The method of claim 13, wherein the impending failure comprises an increase in friction generated by the rotation of the components, the indicator of the pending failure comprises a change in a vibration characteristic transmitted by the components as a result of the increase in friction, and at least one of the sensors is configured and operable for sensing the change in the vibration characteristic.

21. The method of claim 20, wherein the at least one of the sensors comprises an accelerometer.

22. The method of claim 13, wherein the impending failure comprises a change in a spacing between two of the components, the indicator of the impending failure comprises a change in a sound emitted by the components as a result of the change in the spacing, and at least one of the sensors is configured and operable for sensing the change in the sound.

23. A method for detecting impending failure of a component of an individual cutterhead of a disc cutterbar including a plurality of cutterheads, comprising a step of:

automatically differentiating data outputted by a plurality of sensors disposed in or in proximity to the cutterheads, respectively, to determine a threshold value indicative of presence of a condition indicative of the impending failure, and polling the data from the sensors individually to determine existence of the condition in the cutterhead by determining a deviation in the signal of that cutterhead from the signals of the cutterheads proximate thereto.

* * * * *